United States Patent [19]

Vladimir

[11] 3,833,907

[45] Sept. 3, 1974

[54] LANDING AND APPROACH SYSTEM SCAN-RATE STATION IDENTIFICATION

[75] Inventor: Leonard O. Vladimir, Chappaqua, N.Y.

[73] Assignee: The Singer Company, Little Falls, N.J.

[22] Filed: Jan. 2, 1973

[21] Appl. No.: 320,016

[52] U.S. Cl......... 343/108 M, 343/107, 343/108 R, 343/109
[51] Int. Cl............................................. G01s 1/16
[58] Field of Search........... 343/108 M, 108 R, 110, 343/102, 107, 109

[56] References Cited
UNITED STATES PATENTS

| | | | |
|---|---|---|---|
| 2,587,995 | 3/1952 | Griggs | 343/108 M |
| 3,401,389 | 9/1968 | Toman | 343/108 M |

Primary Examiner—Richard A. Farley
Assistant Examiner—Richard E. Berger
Attorney, Agent, or Firm—T. W. Kennedy

[57] ABSTRACT

A method of and apparatus for providing Morse Code identification of a microwave landing system transmitting station in which the glide slope and localizer beams are switched at a first frequency to transmit a dot or dash and at a second frequency to transmit a space and the first frequency then decoded, using a band pass filter in the airborne receiver, and used to key an audio oscillator to provide the pilot with an audio output.

9 Claims, 3 Drawing Figures

PATENTED SEP 3 1974 3,833,907

LANDING AND APPROACH SYSTEM SCAN-RATE STATION IDENTIFICATION

BACKGROUND OF THE INVENTION

This invention relates to microwave landing systems in general and more particularly to an improved means of station identification in such landing systems.

A basic requirement of microwave landing systems is that they be able to provide a Morse Code identification of the transmitting station. This permits the pilot in the aircraft to be assured that he is locked in on the proper station when making an instrument approach. In the past such information was generally provided by means of either amplitude modulating or frequency modulating the beams transmitted by the ground station. The signals were then demodulated and used to key an audio oscillator to provide the pilot with an aural indication of the ground station identification. Although these systems work quite well, the electronics required for their implementation are complex and costly. Thus, there is a need for a simple method of encoding ground station information for such landing systems. For more detail as to a typical landing system in which the present invention may be used, see Application Ser. No. 320,376 filed by P. R. Tierney et al. on even date herewith and assigned to the same assignee as the present invention.

SUMMARY OF THE INVENTION

The present invention makes use of the fact that in microwave landing systems a plurality of beams, generally a right and a left beam for localizer information and an upper and lower beam used for glide slope information are alternately switched in and out. Because the switching rate of these beams is not critical, it is possible to use the beam switching rate to encode the ground station identification. Dots and dashes are encoded by switching at a first frequency and the spaces therebetween by switching at a different frequency. The receiver in the aircraft, instead of containing complex demodulating systems as was required in the prior art, contains simple filters which can discriminate between the two switching frequencies and provide an output to key the audio oscillator.

DETAILED DESCRIPTION OF THE PREFERRED EMBODIMENT

Figure 1:
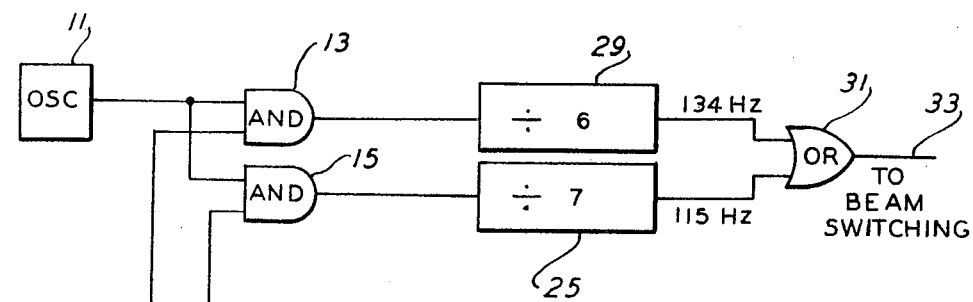
FIG. 1 is a block-system diagram illustrating the preferred embodiment of the code generator required at the transmitter.

The circuits required to generate the beam switching signals are shown on FIG. 1. An oscillator 11 provides an output frequency of for example, 805 hertz. This is provided as one input to AND gates 13 and 15. The other input to AND gates 13 and 15 is obtained from a code wheel 17 which will have encoded thereon in alternate clear and opaque areas, the Morse Code station identification. Wheel 17 is driven at a constant rate by motor 19. A lamp 21 is placed on one side of the wheel 17 and a photodetector 23 on the other side. Each time a clear area is detected, the detector will provide an output to AND gate 15 enabling the pulses from oscillator 11 to pass therethrough to a dividing chain 25 where the frequency will be divided by 7 resulting in an output frequency of 115 hertz, for example. When an opaque area is encountered on the wheel 17, the detector 23 will have a low output which will be inverted by a logic inverter 27 to provide an enabling input to AND gate 13. This will permit the pulses from the oscillator 11 to be provided to a dividing chain 29 where the frequency will be divided by 6 resulting in an output of approximately 134 hertz. Each of the chains can comprise a plurality of flip flops and gates arranged in a well known manner to form a divide by N counter. It should be noted at this point that the frequencies herein are used in an example and that other frequencies can equally well be used.

The outputs of the dividing chains 25 and 29 are then provided as inputs to an OR gate 31 which will allow the one of them which is an input, through its respective gate 13 or 15, to supply an output through the OR gate 31 to the beam switching circuits via line 33. The 134 hertz signal may be used to designate a space and the 115 hertz signal a mark, i.e., a dot or a dash. Thus, there will be clear areas on the code wheel 17 for each dot and dash, the length of the clear space being determined by whether a dot or a dash is to be transmitted, and opaque areas for the spaces between dots and dashes, with larger spaces being provided between each character in the identifying code.

Figure 2B:
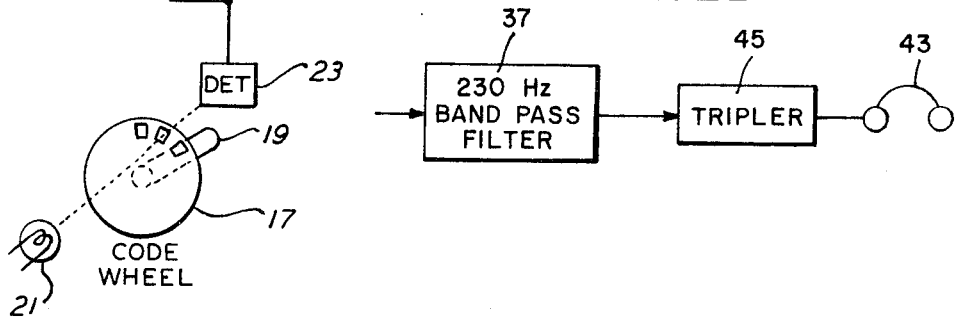
FIG. 2B is a similar diagram of a second embodiment of the decoding circuits in the airborne receiver.
Figure 2A:
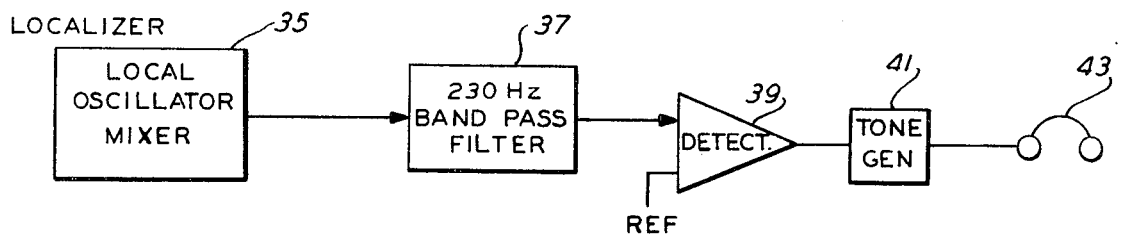
FIG. 2A is a block-circuit diagram of the first embodiment of the decoding circuits in the airborne receiver.

The circuits to decode the identification transmitted are shown in FIG. 2. The landing system airborne receiver will typically contain two local oscillator mixers, one for the localizer channel and one for the glideslope channel. The output of one of these, preferably the localizer channel is provided to a 230 hertz bandpass filter 37. Since the output of the mixer 35 may contain information from either or both the right and left localizer channels, it may contain a signal at either 230 hertz or one at 115 hertz. That is to say that each of the four beams is on one-quarter of the time. For example, the right beam will be turned on for a period, the upper beam for an equal period, the left beam for a similar period and the lower beam for another. If the receiver is receiving only one of the beams then the input will appear at a frequency of 115 hertz. However, if it is in a position to receive both beams, then the frequency at the output of the mixer will be 230 hertz. However, the 115 hertz signal will contain a second harmonic at the 230 hertz frequency which has a maximum deviation from that of the 230 hertz signal of less than 6 db i.e., as indicated above, the signals are switched on and off and thus, would be in the form of square pulses. As is well known, a square pulse can be represented by a series such as a Fourier series made up of sinusoidal components at the major frequency along with harmonics thereof. It is well known that for a wave such as this, the second harmonic will have an amplitude which is down no more than 6 db from the primary frequency. Thus, by placing the 230 hertz bandpass filter at the output of the mixer, it is possible to detect when either signal occurs. The output of the filter 37 is then provided to a detector 39 where it is compared with a reference voltage value which must be exceeded to indicate the presence of a signal. Detector 39 may be a conventional comparator microcircuit such as those available from Motorola, National Semiconductor Fairchild, etc. The output of the detector is then used to key a tone generator 41 which will comprise a audio oscillator outputing a frequency in the vicinity of 1,000 hertz. This is then provided to earphones or a speaker 43 so that the pilot may have an aural indication of the station to which he is tuned. An alternate method of obtaining the required audio frequency is indicated by the portion of the figure in dotted lines. As shown on FIG. 4B, in place of the detector 39 and the tone generator 41, a frequency tripler 45 could be used between the filter 37 and the earphones 43.

Thus, a simple and straight forward method of providing ground station identification in a microwave landing system has been shown. Although a specific embodiment has been shown and described, it will be obvious to those skilled in the art that various modifications may be made without departing from the spirit of the invention which is intended to be limited solely by the appended claims.

I claim:

1. In a microwave landing system of the type wherein a left localizer, upper glide slope, right localizer, and lower glide slope beam are switched on and off in sequence, for reception by an airborne receiver, apparatus to permit transmitting and receiving a Morse Code identification of the station transmitting the beams comprising:
   a. means to generate a beam switching input to the transmitter to cause the beams to be switched at a first frequency to represent a mark and a second frequency to represent a space; and
   b. means in the airborne receiver to decode said first frequency and provide a tone output on each occurrence of said first frequency.

2. The invention according to claim 1 wherein said means to generate said switching input comprise:
   a. means to generate logic signals representative of the station code;
   b. an oscillator; and
   c. means to divide said oscillator output by a first number when said logic signal indicates a mark and by a second number when said logic signal indicates a space.

3. The invention according to claim 2 wherein said logic signal means provides a first signal when a mark is to be transmitted and a second signal when a space is to be transmitted and said means to divide comprise:
   a. a first AND gate having said oscillator output and said first signal as inputs;
   b. a first divider, adapted to divide by said first number, obtaining its input from said first AND gate;
   c. a second AND gate having said oscillator output and said second signal as inputs;
   d. a second divider, adapted to divide by said second number, obtaining its input from said second AND gate; and
   e. an OR gate having the outputs of said first and second dividers as inputs and providing said beam switching input to said transmitters as its output.

4. The invention according to claim 3 wherein said logic means comprise:
   a. a code wheel having alternate opaque and clear areas representing the station code;
   b. means to rotate said wheel;
   c. a light source on one side of said wheel;
   d. a photodetector on the other side of said wheel opposite said light source; and
   e. an inverter coupled to the output of said detector whereby said detector output is said first logic signal and said inverter output said second logic signal.

5. The invention according to claim 1 wherein said means to decode comprises:
   a. a bandpass filter centered at the second harmonic of said first frequency and having its input coupled to one of the local oscillator mixer outputs of the receiver;
   b. a detector coupled to the output of said filter to provide an output when its input exceeds a value indicative of signal reception at one of said first frequency and said second harmonic;
   c. an audio tone generator; and
   d. a sound transducer coupled to said tone generator to provide an aural tone output.

6. In a microwave landing system of the type wherein a left localizer, upper glideslope, right localizer, and lower glideslope beam are switched on and off in sequence, for reception by an airborne receiver, apparatus to permit transmitting and receiving a Morse Code identification of the station transmitting the beams comprising:
   a. a code wheel having alternate opaque and clear areas representing the station code;
   b. means to rotate said wheel;
   c. a light source on one side of said wheel;
   d. a photodetector on the other side of said wheel opposite said light source;
   e. an inverter coupled to the output of said detector whereby said detector output provides a first logic signal and said inverter output provides a second logic signal;
   f. an oscillator;
   g. a first AND gate having said oscillator output and said first signal as inputs;
   h. a first divider, adapted to divide by a first number, obtaining its input from said first AND gate and providing an output at a first frequency;
   i. a second AND gate having said oscillator output and said second signal as inputs;
   j. a second divider adapted to divide by a second number obtain its input from said second AND gate and providing an output at a second frequency;
   k. an OR gate having the outputs of said first and second dividers as input and providing its output as a beam switching input to the transmitter;
   l. a bandpass filter in the airborne receiver countered at the second harmonic of said first frequency and having its input coupled to one of the local oscillator mixer outputs of the receiver;
   m. a detector coupled to the output of said filter to provide an output when its input exceeds a value indicative of signal reception at one of said first frequency and second harmonic;
   n. an audio tone generator; and
   o. a sound transducer coupled to said tone generator to provide an aural tone output.

7. In a microwave landing system of the type wherein a left localizer, upper glideslope, right localizer, and lower glideslope beam are switched on and off in sequence, for reception by an airborne receiver, a method to permit transmitting and receiving a Morse Code identification of the station transmitting the beams comprising:
a. switching the beams at a frequency to represent a mark and at a second frequency to represent a space; and
b. decoding said first frequency in the airborne receiver to provide a signal to key an audio tone generator.

8. The method of claim 7 wherein said decoding is done by passing the output of one of the local oscillator mixers in the receiver through a bandpass filter centered at the second harmonic of said first frequency.

9. The method according to claim 8 wherein the filter is coupled to the localizer local oscillator mixer output.

* * * * *